United States Patent
Pantaloni

(10) Patent No.: US 9,595,001 B2
(45) Date of Patent: Mar. 14, 2017

(54) ROM TAG HAVING IMPROVED READING CAPABILITY

(71) Applicant: NEOPOST TECHNOLOGIES, Bagneux (FR)

(72) Inventor: Jean-Baptiste Pantaloni, Ussiani (FR)

(73) Assignee: NEOPOST TECHNOLOGIES, Bagneux (FR)

( * ) Notice: Subject to any disclaimer, the term of this patent is extended or adjusted under 35 U.S.C. 154(b) by 0 days.

(21) Appl. No.: 14/755,726

(22) Filed: Jun. 30, 2015

(65) Prior Publication Data

US 2016/0155044 A1    Jun. 2, 2016

(30) Foreign Application Priority Data

Dec. 2, 2014    (EP) .................................. 14306938

(51) Int. Cl.
G06K 19/07      (2006.01)
G06K 19/077     (2006.01)
H01F 17/04      (2006.01)

(52) U.S. Cl.
CPC . *G06K 19/07754* (2013.01); *G06K 19/07749* (2013.01); *G06K 19/07771* (2013.01); *H01F 17/04* (2013.01)

(58) Field of Classification Search
CPC .............................. G06K 19/077; H01F 17/04
See application file for complete search history.

(56) References Cited

U.S. PATENT DOCUMENTS

| | | | |
|---|---|---|---|
| 7,109,867 B2* | 9/2006 | Forster | G08B 13/2414 340/572.3 |
| 2009/0066466 A1* | 3/2009 | Arimura | H04B 5/00 336/221 |
| 2015/0215684 A1* | 7/2015 | Kauffman | G06K 19/0723 340/870.16 |

FOREIGN PATENT DOCUMENTS

| | | |
|---|---|---|
| DE | 102005031579 A1 | 1/2007 |
| DE | 202011004292 U1 | 3/2011 |
| GB | 2 429 878 A | 3/2007 |
| JP | 2010103313 A | 5/2010 |
| WO | 2007003293 A1 | 1/2007 |

OTHER PUBLICATIONS

European Search Report, mailed May 4, 2015, EP 14306938, 2 pages.

* cited by examiner

*Primary Examiner* — Christle I Marshall
(74) *Attorney, Agent, or Firm* — Seed IP Law Group LLP

(57) ABSTRACT

A communication device designed to operate on any type of surface, when affixed onto that surface, comprising: a magnet having a flat face, said magnet generating a magnetic field perpendicular to said flat face and a RFID on metal tag having a mounting base fixedly assembled on said flat face of the magnet.

15 Claims, 3 Drawing Sheets

ROM TAG HAVING IMPROVED READING CAPABILITY

FIELD OF THE INVENTION

The present invention relates to the identification and tracking of items and more particularly to the improvement of the read range of RFID on metal tags, which can be affixed onto small items.

PRIOR ART

Today's business practices often require that items be traced during the production and distribution phases and more particularly in the case of high value products. Such tracing is beneficial for tracking shipments as well as for tracking items within an industrial site. The tracing of items is based on identifying the items at different stages.

Generally, an identification data (ID) device attached to each item is required. For productivity purposes, such an ID device needs to be read remotely and automatically by electronic interrogators. Automation also reduces errors in information capture and allows for more accurate and more regular inventory management. This requires ID devices, which can communicate. Radio frequency identification (RFID) is a preferred solution as radiofrequency communication allows a diffuse transmission and is tolerant to RFID devices being hidden, as opposed to optical solutions, which are more directional and quite intolerant to blocking bodies lying in the transmission path.

The use of RFID tags is an efficient and economical method for such systems. Shippers can check the location and conditions of shipped items in real time, or producers can check the location of items, such as mobile tools, in real time, by remotely accessing the data being transmitted by RFID tags attached to those items. Therefore, RFID tags are widely used for the identification and tracking of items, particularly for items in a shop or warehouse environment.

The two main types of RFID systems for logistics are HF RFID (high frequency) and UHF RFID (ultra high frequency). For the HF systems, the remote communication with the RFID tag is carried out by a non-propagating near field magnetic coupling. The antenna of the HF RFID tag consists of an inductive loop. The HF RFID tag captures signals, which generate a variation of magnetic flux across its antenna inductive loop. And inversely, the HF RFID tag responds by generating a non-propagating magnetic field with its antenna inductive loop. For the UHF systems, the remote communication with the UHF RFID tag is carried out by a propagating electromagnetic wave. Typically, the antennas of UHF RFID tags consist of dipoles, which primarily interact with the electric field of the electromagnetic wave.

Both HF and UHF RFID tags are widely used for logistics and inventory. However, it is well-known that conventional RFID tags, for both UF and UHF technologies, do not work properly when placed against an electrically conductive surface, typically a metal or a liquid surface. Because the HF and UHF technologies are different, the causes leading to the decrease in performance of RFID tags on electrically conductive surfaces are different and the solutions are different for these two technologies.

For HF RFID tags, when the flat inductive loop antenna is placed onto an electrically conductive surface such as a metal, the magnetic flux is perturbated by the electrically conductive surface and cannot flow across the antenna inductive loop as it would without the electrically conductive surface. Eddy currents, generated by the alternating magnetic field in the electrically conductive surface, counteract with the incident magnetic field carrying the signal and lead to the detuning of the inductive loop antenna. These perturbing mechanisms result in attenuating the communication signals and in unreliable read rates when HF RFID tags are placed on electrically conductive surfaces or in environments that contain materials like metals and liquids. To reduce the perturbation of the magnetic flux by the electrically conductive surface, one solution is to add a "spacer" between the antenna inductive loop and the electrically conductive surface. Using spacers improves performance to some degree, but creates other problems. Adding spacers greatly complicates tag production and tag programming. These issues would be manageable if the spacers truly solved the problem, but tags using spacers still have performance limitations. Another solution is to add between the antenna inductive loop and the electrically conductive surface a material layer with a high magnetic permeability (real part of the complex permeability) and low loss (imaginary part of the complex permeability). Such a material layer canalizes the magnetic field and makes it loop around the antenna inductive loop so that the interaction of the magnetic field with the electrically conductive surface is minimized. This canalization is all the more effective as the magnetic permeability of the material layer is high. Such a material layer helps minimizing the attenuation of the communication signals due to the presence of metal, and the HF RFID tag including such a material layer are traditionally called anti metal HF tags. For UHF RFID tags, when the tag is placed on an electrically conductive surface, the electrically conductive surface reflects the electromagnetic waves carrying the communication information and creates interferences, which degrade the tag readability. One commonly experienced disadvantage with conventional UHF tags is that, if directly placed on a metal surface, their read range is decreased to unacceptable levels and eventually the tag cannot be read or interrogated. When a UHF RFID tag is placed near or in direct contact with a metallic surface, the tag's antenna interacts with this electrically conductive surface, and hence the antenna resonant properties are degraded or generally negated. Therefore, the tracking of metal items such as cages or containers is very difficult to achieve with UHF RFID tags and so other more expensive location systems have to be employed, such as GPS.

UHF RFID tags also experience similar problems when applied to any surfaces which interact with RF waves such as certain types of glass and surfaces which possess significant water content, or such as, for example, certain types of wood with a high water or sap content. Problems will also be encountered when trying to tag materials, which contain water such as, for example, water bottles, drinks cans or human bodies. This problem is particularly true for passive tags—that is tags, which have no power source and which rely on incident energy for operating. However, semi passive and active tags, which employ a power source, such as an onboard battery, also suffer detrimental effects on account of this problem. In order to compensate for the effects of metal, there are currently two main design methods. The first approach is to introduce a spacer to shield the tag UHF antenna from the metal, creating bigger and thicker tags. This first approach consists, for example, in placing a foam spacer or some type of mounting between the UHF RFID tag and the surface, which prevents interaction between the antenna and the surface. With currently available systems the foam spacer typically needs to be at least 10-15 mm thick in order to physically separate the RFID tag from the surface by a sufficient distance, resulting in tags having a total thickness up to 30 mm. Clearly, such protruding tags are impractical for many applications and are prone to being accidentally knocked and damaged or ripped off. The second approach benefits from new techniques based on specialized antenna design that utilizes the metal interference and signal reflection for longer read range than conventional similar sized UHF tags attached to non-metal objects. These UHF tags specifically design to be attached to metals are generally called RFID-on-metal tag, i.e. ROM tag. For operating on a metal, the ROM tag is designed so that its coupling with the metal support optimizes the resonance of the set tag antenna and metal support.

Conventional propagating-wave UHF RFID tags use an integral antenna for receiving the incident radiation signal. For these tags, the antenna's dimensions depend on the frequency at which it must resonate. In the Ultra High Frequency (UHF) band between 840 MHz and 960 MHz, widely used for RFID tags, and more particularly, in Europe, in the unique allotted band 866-869 MHz, or in USA in the corresponding band 902-928 MHz, the typical antenna size is at least 50 mm long (the wavelength being between 32 cm and 34 cm). But RFID-on-metal (ROM) tag manufacturers can provide, for the UHF band, tags as small as 6 mm in diameter and 2 to 3 mm in thickness. These new techniques allow the production of compact tags, which can be characterized by their maximum dimension (or diameter) being below a tenth of their operation wavelength. Such compact dimensions, especially of the antenna, cannot be achieved with technologies other than the ROM tag technologies.

New techniques such as described in GB2429878 allow the production of compact ROM tags. In addition to avoiding thick spacers, such new techniques also integrate a miniaturization of the tag antenna.

However, ROM tags have the following drawbacks: they need to be affixed onto a metallic surface to operate properly, and specific geometry of the metallic elements on which they are affixed may decrease their read range to unacceptable levels and eventually the tag may not be read or interrogated. For example, if the ROM tag is affixed on a metallic surface, whose area has a lower diameter than half the operational wavelength of the ROM tag, the read range of the ROM tag may be reduced. Given the compactness of the new ROM tags, the read range can be significantly reduced when the metal area, on which the ROM tag is affixed, is of the same order as the ROM tag dimension.

SUMMARY

One object of the invention is to propose a device, which improves the read range of the ROM tag comprised in the device when placed on metal. Such a device can operate on metallic surface geometries, on which the ROM tag alone would have an unacceptable read range.

Another object of the invention is that this device comprising a ROM tag can operate on any support surface such as an insulator surface, and not only on a metallic surface or an electrically conductive surface as a ROM tag alone would.

Given the compactness of the new ROM tags, the communication device object of the invention can be affixed on small objects of any kind, metallic or not, which require to be traced. With such devices, new RFID applications can be developed for security or traceability of small objects. Typical fields of application for individual items are the jewelry industry or any industry involving small high value items, such as the pharmaceutical industry or industries using caps for example for bottle or test tubes.

To this end, the invention provides a communication device designed to operate on any type of surface, when affixed onto that surface, comprising:

a magnet having a flat face, said magnet generating a magnetic field perpendicular to said flat face a RFID on metal tag having a mounting base fixedly assembled on said flat face of the magnet.

In a preferred embodiment of the invention, said magnet and said RFID on metal tag are fixedly mechanically linked together by a fastening part.

Advantageously, said fastening part surrounds in part said magnet and said RFID on metal tag.

Conveniently, said fastening part when surrounding in part said magnet and said RFID on metal tag is embeddable in a cavity of said surface.

In another embodiment of the invention, said magnet and said RFID on metal tag are embeddable in a cavity of said surface.

In another embodiment of the invention, said flat face of said magnet includes a cavity for receiving said RFID on metal tag.

Preferably, said RFID on metal tag and said magnet are glued together so as to form an inseparable assembly.

Advantageously, said RFID on metal tag operates in the UHF range and that said magnet and said RFID on metal tag have maximum dimension below a tenth of the operation wavelength of said RFID on metal tag.

Another advantage is that said communication device has a read range at least fifty times longer than the maximum dimension of said communication device.

Preferably, said magnet is a neodymium-iron-boron rare-earth magnet and can have a flat cylindrical shape.

Depending of the embodiment, said surface can be made of insulator material, of electrically conductive material or of magnetic material.

The invention also relates to a method for improving the read range of a RFID on metal tag comprising fixedly assembling said RFID on metal tag having a mounting base onto a magnet having a flat face, said magnet generating a magnetic field perpendicular to said flat face.

BRIEF DESCRIPTION OF THE DRAWINGS

Other aspects, features and advantages of the present teachings will become clearer to those ordinary skilled in the art upon review of the following description in conjunction with the accompanying drawings where.

DETAILED DESCRIPTION OF EMBODIMENTS

The principle of the invention is to combine the ROM tag with a magnet. Typically the magnet is a permanent magnet such as rare-earth magnet neodymium-iron-boron (NIB) made from an alloy of neodymium, iron and boron. Alnico magnets or rare-earth magnets are particularly appropriate as their magnetic density is such that they can be miniaturized and still can maintain some significant magnetic strength.

A ROM tag generally has a flat aspect so that one of its flat surfaces can be affixed onto the item to be identified. This ROM tag flat surface serves as a mounting base and is identified on the ROM package by the manufacturer. The ROM tag primarily radiates in the direction perpendicular to its mounting base. However, depending on the tag's design and on its environment, the radiation pattern can be more or less isotropic around the principal direction, which is perpendicular to the ROM tag's mounting base.

Figure 1:
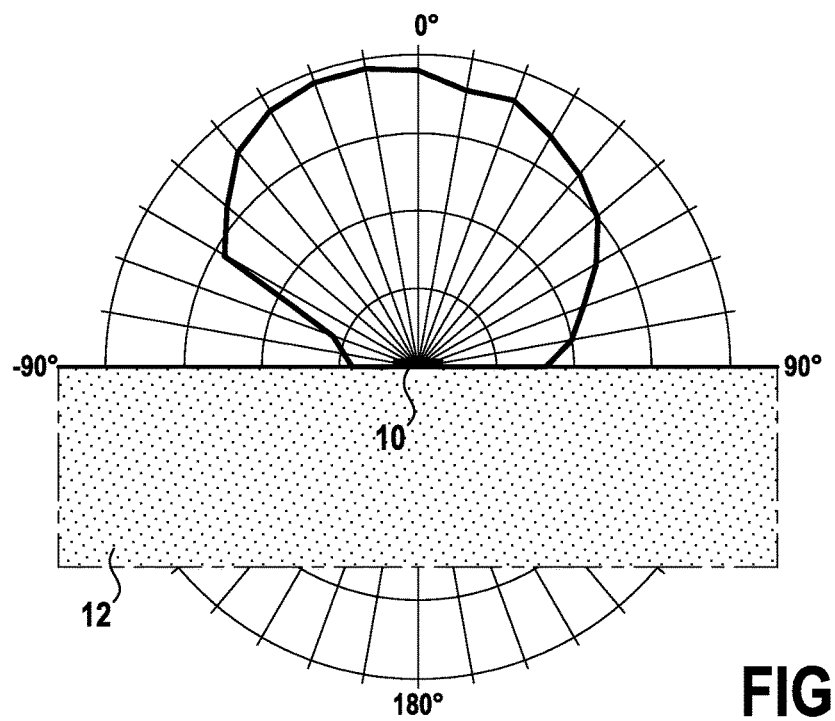
FIG. 1 shows in a plane perpendicular to the large support surface a radiation pattern of a prior art ROM tag Fit200® positioned on a large metallic support.
Figure 2:
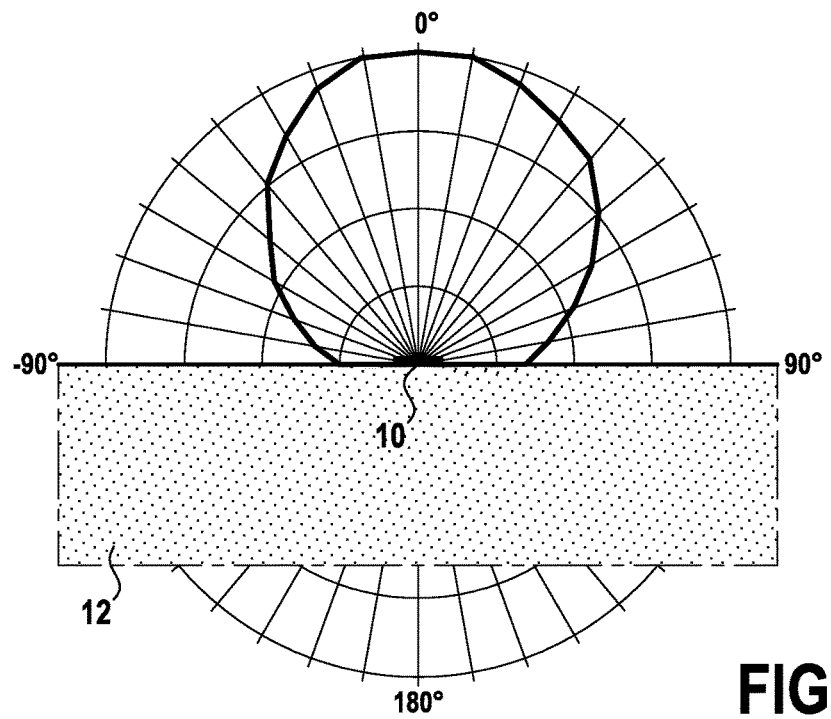
FIG. 2 shows, in a plane perpendicular to the large support surface and perpendicular to the radiation plane of FIG. 1, a radiation pattern of a prior art ROM tag Fit200® positioned on a large metallic support.
Figure 3:
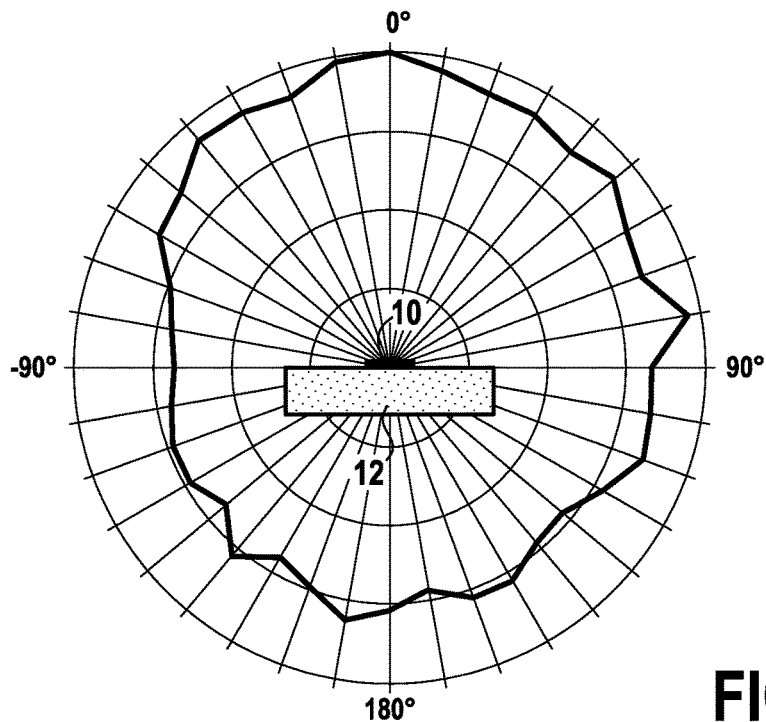
FIG. 3 shows in a plane perpendicular to the small support surface a radiation pattern of a prior art ROM tag Fit200® positioned on a small metallic support.
Figure 4:
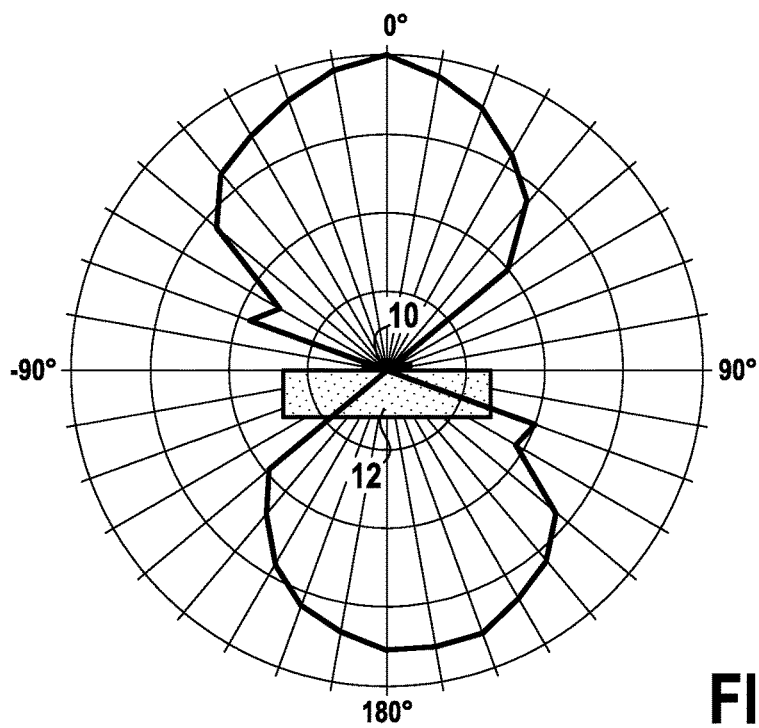
FIG. 4 shows, in a plane perpendicular to the small support surface and perpendicular to the radiation plane of FIG. 3, a radiation pattern of a prior art ROM tag Fit200® positioned on a small metallic support.

FIGS. 1 to 4 show the radiation pattern of a prior art ROM tag referenced as Fit200® and manufactured by Omni-ID. The data displayed on these graphics correspond to the normalized read range in different directions. For each of these four figures, the ROM tag mounting base is affixed on a metallic support. In FIGS. 1 and 2, the ROM tag 10 is positioned on a large metallic support 12. The radiation pattern is directed only outside the metallic support. The main direction of the radiation lobe is perpendicular to the support surface. The FIGS. 1 and 2 show the radiation pattern of the ROM tag in two perpendicular planes, each of them being perpendicular to the large support surface. In FIGS. 3 and 4, the ROM tag 10 is positioned on a small metal item 14. The radiation pattern displays a significant backscattering behind the small metallic support. The main direction of the radiation is perpendicular to the support surface and forward. The FIGS. 3 and 4 show the radiation pattern of the ROM tag in two perpendicular planes, each of them being perpendicular to the small support surface.

In the case of the invention, the magnet must be oriented so that its magnetic field is perpendicular to the mounting base of the ROM tag. Other orientations of the magnet in regards to the ROM tag are possible, but tests have proven that the improvement of read distances is then less effective.

Magnets with small form factor and designed for general use often have the shape of a flat circular cylinder. The magnetic field is oriented perpendicularly to the disk surfaces of the cylinder. An example of such a magnet is the flat cylindrical Neodymium-iron-boron magnet referenced as S-10-03-N, manufactured by Webcraft GmbH and distributed by Supermagnete. As described earlier, electromagnetic waves used with UHF technologies reflect on electrically conductive surfaces. In other words, the electromagnetic waves do not penetrate into the conductor, but are confined to the surface of the conductor. This phenomenon, called skin effect, limits the penetration of the electromagnetic waves to a skin depth of the conductor in the range of the micrometer for UHF electromagnetic waves, and results in the refection of the electromagnetic waves on the surface of the conductor. Such a reflection of UHF electromagnetic waves would take place on electrically conductive magnets such as rare-earth magnets or alnico magnets. In the case of the Neodymium-iron-boron magnet S-10-03-N, this magnet is coated with a nickel outside layer. This electrically conductive coating also reflects UHF electromagnetic waves and prevents any penetration of UHF electromagnetic waves into the magnet.

Figure 5:
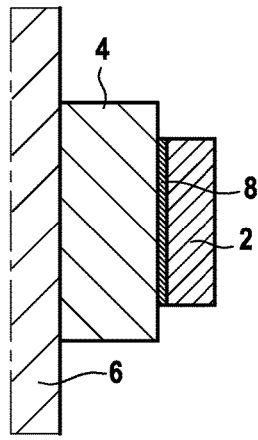
FIG. 5 is a schematic view of the communication device of the invention attached permanently or temporarily onto an item.

FIG. 5 illustrates a communication device combining a ROM tag 2 with a magnet 4 according to the invention. The mounting base 8 of the ROM tag is affixed onto a flat surface of the magnet 4; the magnetic field of the magnet 4 being generated perpendicularly to this flat surface of the magnet 4. In the case of a flat cylindrical magnet such as S-10-03-N, this flat surface would be one of the disk surfaces of the cylinder. Either disk surface can be used for affixing the ROM tag as tests have proven that the results are the same for both surfaces. In other words, the improvement of the read range depends only on the direction of the magnetic field and not on its sense.

The ROM tag is preferably glued onto the magnet using for example a resin or an epoxy or an acrylic adhesive. However, any method for affixing the ROM tag onto the magnet can be used by those ordinary skilled in the art, as long as it does not alter significantly the tag or the magnet performance and also if it fits with the final usage of the communication device. In particular, the ROM tag can be riveted onto the magnet or can be stuck onto the magnet after peeling off the release liner for some special ROM tag packages.

Advantageously, instead of gluing together the ROM tag and the magnet, a fastening part surrounding in part the ROM tag and the magnet maintains fixedly together the ROM tag and the magnet. Such a fastening part provides an additional advantage as a mechanical protective shield for the associated ROM tag and magnet. A convenient way to affix the communication device onto the item to be identified is to embed the communication device into this item. Such an embedding can be operated in a cavity pre-existing in the item, or in a cavity cut into the item surface specifically for the purpose of embedding the communication device. Preferably, the communication device rests on the end bottom surface of the cavity. However, the cavity may be deep with a depth more important than the communication device length. This would be the case for example when the communication device is inserted in a bottle neck or in a test tube. In such a case, the affixing of the communication device into the item uses the sides of the communication device, which are in contact with the sides of the item cavity. For supporting the embedding of the communication device into the item, the external surface of the fastening part is shaped according to the item cavity destined to hold the communication device. Preferably, the cavity cut into the item surface is cylindrical with a circular base. The external surface of the fastening part matches in part the surface of the item cavity and at least matches in part the cylindrical part of the surface of the cavity. For example, apertures may be provided in the fastening through the external surface so that the ROM tag or the magnet can be inserted into the fastening. In order to ensure a fixedly embedding of the communication device, the largest diameter of the fastening part is larger than the diameter of the cylindrical cavity. Preferably, the fastening part is made of soft material such as plastic. In that case, the largest diameter of the fastening part is larger than the diameter of the cylindrical cavity by 0.5% to 5%, preferably by 2%. Typical appropriate plastic materials are the ®Hostaform or the ®Hosalen from Hoechst AG. A particular application is the encapsulation of the ROM tag and the magnet. The encapsulating material provides the fastening together of the ROM tag and the magnet, as well as a mechanical protection for the communication device thus assembled. The encapsulating material is shaped so as to provide a tip with a smaller diameter than the diameter of the item cavity on the side of the magnet so that this tip can help directing the embedding of the communication device into the item cavity.

Figure 6:
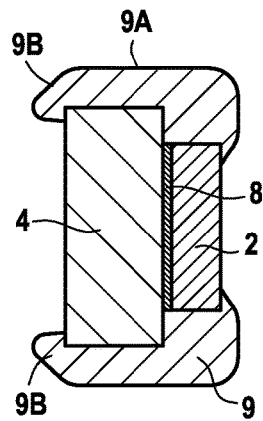
FIG. 6 is a schematic view of a preferred embodiment for fastening fixedly together the ROM tag and the magnet.

FIG. 6 illustrates a fastening part 9 maintaining fixedly together the ROM tag and the magnet. The part 9 fastens together the ROM tag 2 and the magnet 4, where the mounting base 8 of the ROM tag is affixed onto a flat surface of the magnet 4; the magnetic field of the magnet 4 being generated perpendicularly to this flat surface of the magnet 4. The external surface 9A of the fastening part 9 has a cylindrical shape. This surface 9A may only partially surround the sides of the ROM tag and the magnet (as illustrated on FIG. 9). Apertures (not represented on the FIG. 6) may be provided in the fastening part 9 through the external surface 9A so that the ROM tag 2 and/or the magnet 4 can be inserted into the fastening part 9. Additionally, the fastening part 9 is shaped on the side of the magnet 4 so as to provide an area 9B with a smaller diameter than the diameter of the item cavity. Such a shaping of the area 9B helps directing the communication device into the item cavity during the embedding process.

Figure 7:
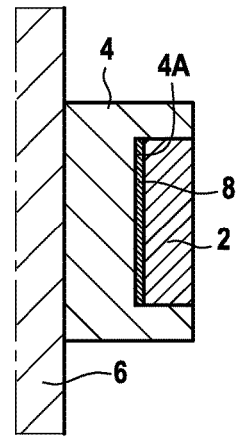
FIG. 7 is a schematic view of another embodiment of the communication device of the invention.

A preferred configuration of the communication device of the invention is illustrated on FIG. 7. In this configuration, the ROM tag 2 is embedded into a cavity 4A prepared in the magnet 4. Preferably, the cavity 4A is circular for optimal signal range. Again, any method for affixing the ROM tag 2 within the cavity 4A can be used. However, a preferred method for affixing the ROM tag 2 is to glue it in the cavity 4A with an epoxy, and then to fill in the cavity with resin.

The communication device of the invention, as illustrated in FIG. 5 or in FIG. 6 or in FIG. 7, can then be permanently or temporarily attached to an item 6, which needs to be identified. The ROM tag comprises identification data relative to this item. As described in more details below, one major benefit of the invention is to alleviate any restriction on the type of support material—electrically conductive or non-conductive, magnetic or non magnetic. However, in the case of a magnetic support, for example a metallic support, the invention device is particularly appropriate for a temporary attachment as the magnetic part of the device can readily attach to the support and the device can be easily removed later on.

Figure 8:
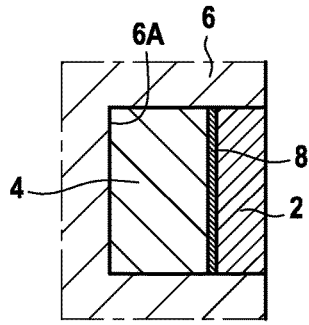
FIG. 8 is a schematic view of a preferred embodiment for embedding the ROM tag and the magnet in an item cavity.

In an alternative embodiment illustrated on FIG. 8, the ROM tag 2 and the magnet 4 are directly embedded into the item 6 to be identified without any preliminary mechanical linking together via a fastening part. Such an embedding can be operated in a natural cavity pre-existing in the item, or in a cavity 6A cut into the item surface specifically for the purpose of embedding the communication device. Preferably, the communication device rests on the end bottom surface of the cavity. However, the cavity may be deep with a depth more important than the communication device length. Then, the affixing of the communication device into the item uses the sides of the communication device, which are in contact with the sides of the item cavity.

As previously described, the mounting base 8 of the ROM tag 2 is affixed onto a flat surface of the magnet 4; the magnetic field of the magnet 4 being generated perpendicularly to this flat surface of the magnet 4. For supporting the embedding of the communication device into the item, the external surface of the associated ROM tag and magnet is shaped according to the item cavity destined to hold the communication device. Preferably, the cavity cut into the item surface is cylindrical with a circular base. The external surface of the associated ROM tag and magnet matches the surface of the item cavity. In one embodiment for fixedly embedding the communication device into the item, the communication device is glued in the cavity, for example with epoxy glue. In another embodiment to ensure a fixedly embedding of the communication device, the diameter of the associated ROM tag and magnet is slightly larger than the diameter of the cylindrical cavity by a value, which can be defined depending on the material involved by those knowledgeable in the art of press fitting. A preferred press fitting method is based on dipping the associated ROM tag and magnet into liquid nitrogen.

Figure 9:
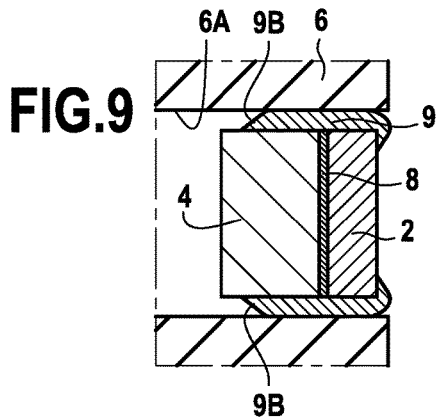
FIG. 9 is a schematic view of another embodiment for embedding the ROM tag and the magnet in an item cavity.

Conveniently, the ROM tag 2 and the magnet 4 could be associated before the embedding in the item surface 6 according to the principle illustrated in FIG. 7, where the ROM tag 2 is embedded in the magnet 4, or as illustrated in FIG. 9, where the fastening part 9 surrounds in part the magnet 4 and the ROM tag 2 before the embedding in the cavity 6A. While this invention has been mainly described in the case of a cylindrical cavity with a circular base and a matching communication device shaped as a cylinder with a circular base, it is to be understood that the invention is not limited to this disclosed embodiment, but is intended to cover various possible cylindrical shapes.

Figure 10:
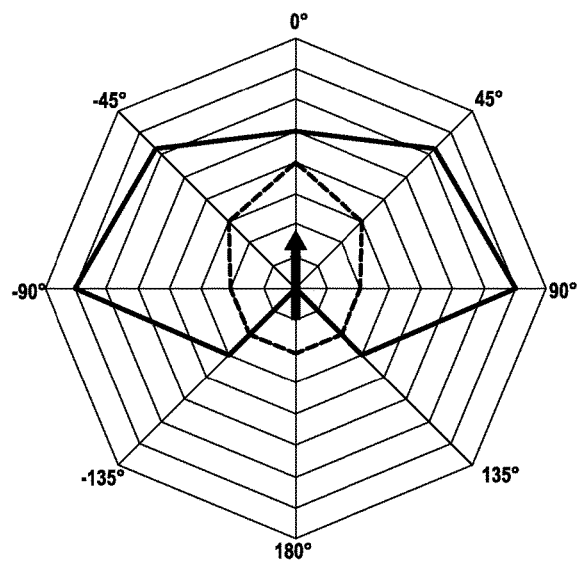
FIG. 10 compares the radiation pattern of the invention and of a Fit200® ROM tag alone.

FIG. 10 compares the radiation pattern in different directions for the communication device as described in FIG. 5 and for a Fit200® ROM tag affixed alone in the same place onto the end surface of a small cylindrical metallic bar. The read ranges for the Fit200® ROM tag affixed alone are reported with the dotted line curve, and the read ranges for the communication device are reported with the solid line curve. The metallic bar has a diameter of 10 mm and a length of 8 cm, which is about a quarter of the operating wavelength of the ROM tag. The arrow in the center of the FIG. 10 indicates the direction of the magnetic field of the magnet included in the communication device. The direction 0° corresponds to the forward direction, i.e. the direction in front of the end surface of the metallic bar on which the communication has been affixed.

As mentioned earlier, a ROM tag performance may be negatively impacted by the geometry of the metallic element on which it is affixed. This is typically the case when the metallic surface, on which the ROM tag is affixed, has a dimension of the same order as the surface of the ROM tag. The particular geometry of a metallic bar, with a diameter of 10 mm and a length of 8 cm, is an example of a metallic geometry for which the read range of the ROM tag is decreased. In this particular case, the metallic surface, on which the ROM tag is affixed, has a dimension of the same order as the area of the ROM tag. The values reported on the FIG. 10 show that for all the radiating directions, except the backward direction which is typically not usable, the read range is improved when using the invention device compared to using the ROM tag alone. The improvement in the backscattered energy corresponds on average to a factor of more than 5. Depending on the application and its environment, such an improvement may be necessary to make the ROM tag usable, and eventually may prove to be critical.

As introduced earlier, one major benefit of the invention is to alleviate any restriction on the type of support material—electrically conductive or non-conductive, magnetic or non magnetic. To establish the improvement effect of a magnet, several RFID tags have been tested, including the widely used ROM tags manufactured by Omni-ID referenced as Fit200® with dimensions 8.6 mm×6.1 mm×2.1 mm or manufactured by Xerafy referenced as Dot-On XS® with dimensions φ6 mm×2.5 mm.

The read range of the RFID tag was measured and compared when the RFID tag alone is affixed onto a support or when the combination of the RFID tag and the magnet as described by the invention is affixed onto the same support. The magnet used for the tests is the Neodymium-iron-boron magnet with dimensions φ10 mm×3 mm, referenced as S-10-03-N, manufactured by Webcraft GmbH and distributed by Supermagnete. The tests have been performed on different types of supports as described as follows.

Table 1 below corresponds to tests performed with a ROM tag positioned on an insulator support type, which is both non-conductive and non-magnetic, and lists the compared measured read ranges in mm, without and with the magnet, in the direction perpendicular to the mounting surface of the tag, for different frequencies. As shown, the read range is improved for the invention device by a factor of more than 5 for all frequencies. This corresponds to an improvement factor of about 30 on average for the backscattered energy. Such an improvement allows the invention device to be used on any type of insulator support, such as dry paper or cardboard, plastic or glass.

TABLE 1

| | Frequency (MHz) | | | |
|---|---|---|---|---|
| | 865.7 | 866.3 | 866.9 | 867.5 |
| without magnet | 10 | 10 | 10 | 10 |
| with magnet | 59.6 | 55.6 | 54.9 | 53.1 |

The improvement resulting from the addition of the magnet between the insulator and the ROM tag is all the more impressive as if the magnet is replaced by a non-magnetized metal part, such as copper or aluminum or non-magnetized iron, with the same shape as the magnet, the read range is barely improved by the addition of this non-magnetized metal part compared with the read range of the ROM tag directly placed onto the insulator.

Table 2 below corresponds to tests performed with a ROM tag positioned on an Aluminum plate (i.e. non magnetic conductor) and lists the compared measured read ranges in mm, without and with the magnet, in the direction perpendicular to the mounting surface of the tag, for different frequencies. The results indicate that the invention device can operate on non magnetic conductors. The comparison of the results without and with the magnet shows that the read range is improved for the invention device for all frequencies. Generally, the usage of a ROM tag alone would be sufficient. However, in the case of more demanding situations, the improvement provided by the invention device compared to the ROM tag alone, may become handy, if not necessary.

TABLE 2

| | Frequency (MHz) | | | |
|---|---|---|---|---|
| | 865.7 | 866.3 | 866.9 | 867.5 |
| without magnet | 72.1 | 75.5 | 78.1 | 81.2 |
| with magnet | 111.6 | 107.8 | 98.4 | 98.4 |

Table 3 below corresponds to tests performed with a ROM tag positioned on an iron plate (i.e. a magnetic conductor) and lists the compared measured read ranges in mm, without and with the magnet, in the direction perpendicular to the mounting surface of the tag, for different frequencies. The comparison of the results without and with the magnet shows that the read range is slightly improved for the invention device. This corresponds to an improvement of about 1.4 for the backscattered energy. For general usage, the backscattered signal of a ROM tag alone on metal is important and would be sufficient. However, in the case of more demanding situations for usage on magnetic conductors, the improvement provided by the invention device compared to the ROM tag alone, may also become handy. Additionally, the invention device can readily attach to magnetic conductors (in particular iron) without any need for gluing or riveting as required for a ROM tag alone, and would still provide a better backscattered signal. Such a property is particularly beneficial for temporary attachment, and provides the possibility for an easy removal of the device later on. It is also beneficial when the item support surface cannot be altered by the affixing method of the ROM tag.

TABLE 3

| | Frequency (MHz) | | | |
|---|---|---|---|---|
| | 865.7 | 866.3 | 866.9 | 867.5 |
| without magnet | 161.2 | 121.6 | 127.4 | 127.4 |
| with magnet | 171.8 | 160 | 153.1 | 142.9 |

For all the tests described above, and whose results have been compiled in Tables 1 to 3, the read ranges of the communication device composed of the ROM tag and of the magnet are all at least fifty times longer than the maximum dimension of the communication device. Also, it must be noted that the significant improvement of the read range of the ROM tag due to a magnet is impressive and surprising, especially as the improvement cannot be evidenced in the case of conventional HF RFID tags as shown below. Table 4 below corresponds to tests performed with a conventional HF RFID tag on an insulator support type (i.e. non-conductor/non magnetic) and lists the compared measured read ranges in mm, without and with the magnet, in the direction perpendicular to the mounting surface of the conventional tag, for different frequencies. The measurements compiled in table 4 show that, on average, the addition of the magnet improves the read range only by a 1.18 factor. This corresponds to an improvement in the backscattered energy of about 1.4, which is not significant compared to the factor of more than 30 for a ROM tag.

TABLE 4

| | Frequency (MHz) | | | |
|---|---|---|---|---|
| | 865.7 | 866.3 | 866.9 | 867.5 |
| without magnet | 27 | 26.1 | 28.3 | 26.7 |
| with magnet | 32.4 | 32.5 | 29.6 | 33.2 |

Additional tests have been performed both on a ROM tag and a conventional tag, where the magnet is replaced by a solenoid (or helical coil). The solenoid generates a magnetic field perpendicular to the mounting surface of the tag, i.e. in the same direction as the magnet, but without the presence of magnetic material. The value of the generated magnetic field is proportional to the electrical intensity passing through the solenoid. When the intensity is null, the magnetic field is null, and the tags can be read as if no solenoid was there. However, when an electrical intensity excites the solenoid, the tags cannot be read anymore—although when a magnet is in the place of the solenoid, the read range is improved. This comparative behavior stresses again the particular effect of the magnet on the performance of RFID tags, and especially on ROM tags.

The invention claimed is:

1. A communication device designed to operate on any type of surface, when affixed onto that surface, comprising:
   a magnet having a flat face, said magnet being a permanent magnet that generates a magnetic field perpendicular to said flat face; and
   a RFID on metal tag having a mounting base fixedly assembled on said flat face of the magnet.

2. A communication device according to claim 1, wherein said magnet and said RFID on metal tag are fixedly mechanically linked together by a fastening part.

3. A communication device according to claim 1, wherein said magnet and said RFID on metal tag are embeddable in a cavity of said surface.

4. A communication device according to claim 1, wherein said RFID on metal tag and said magnet are glued together so as to form an inseparable assembly.

5. A communication device according to claim 1, wherein said RFID on metal tag operates in the UHF range and that said magnet and said RFID on metal tag have a dimension below a tenth of the operation wavelength of said RFID on metal tag.

6. A communication device according to claim 1, wherein said communication device has a read range at least fifty times longer than a largest dimension of said communication device.

7. A communication device according to claim 1, wherein said magnet is a neodymium-iron-boron rare-earth magnet.

8. A communication device according to claim 1, wherein said magnet has a flat cylindrical shape.

9. A communication device according to claim 1, wherein said surface is made of insulator material.

10. A communication device according to claim 1, wherein said surface is made of conductive material.

11. A communication device according to claim 1, wherein said surface is made of magnetic material.

12. A communication device designed to operate on any type of surface, when affixed onto that surface, comprising:
    a magnet having a flat face, said magnet generating a magnetic field perpendicular to said flat face; and
    a RFID on metal tag having a mounting base fixedly assembled on said flat face of the magnet,
    wherein said magnet and said RFID on metal tag are fixedly mechanically linked together by a fastening part and said fastening part surrounds in part said magnet and said RFID on metal tag.

13. A communication device according to claim 12, wherein said fastening part when surrounding in part said magnet and said RFID on metal tag is embeddable in a cavity of said surface.

14. A communication device designed to operate on any type of surface, when affixed onto that surface, comprising:
    a magnet having a flat face, said magnet generating a magnetic field perpendicular to said flat face; and
    a RFID on metal tag having a mounting base fixedly assembled on said flat face of the magnet,
    wherein said flat face of said magnet includes a cavity for receiving said RFID on metal tag.

15. A method for improving the read range of a RFID on metal tag comprising:
    fixedly assembling said RFID on metal tag having a mounting base onto a magnet having a flat face, said magnet being a permanent magnet that generates a magnetic field perpendicular to said flat face.

* * * * *

UNITED STATES PATENT AND TRADEMARK OFFICE
CERTIFICATE OF CORRECTION

PATENT NO. : 9,595,001 B2  
APPLICATION NO. : 14/755726  
DATED : March 14, 2017  
INVENTOR(S) : Jean-Baptiste Pantaloni It is certified that error appears in the above-identified patent and that said Letters Patent is hereby corrected as shown below:

On the Title Page

Item (71):
"Jean-Baptiste Pantaloni, Ussiani (FR)" should read,
--Jean-Baptiste Pantaloni, Ucciani (FR)--.

Signed and Sealed this
Third Day of April, 2018

Andrei Iancu
*Director of the United States Patent and Trademark Office*